(12) United States Patent
McGeehan (10) Patent No.: US 10,694,714 B2
(45) Date of Patent: Jun. 30, 2020

(54) MODULAR CART ASSEMBLY

(71) Applicant: Joyce McGeehan, Bethany, WV (US)

(72) Inventor: Joyce McGeehan, Bethany, WV (US)

( * ) Notice: Subject to any disclaimer, the term of this patent is extended or adjusted under 35 U.S.C. 154(b) by 713 days.

(21) Appl. No.: 15/352,701

(22) Filed: Nov. 16, 2016

(65) Prior Publication Data

US 2018/0132447 A1 May 17, 2018

(51) Int. Cl.
| | |
|---|---|
| *A01K 1/00* | (2006.01) |
| *A01K 1/02* | (2006.01) |
| *B62B 5/06* | (2006.01) |
| *B62B 1/14* | (2006.01) |
| *B62B 1/12* | (2006.01) |
| *B62B 1/00* | (2006.01) |

(52) U.S. Cl.
CPC .............. *A01K 1/0245* (2013.01); *B62B 1/12* (2013.01); *B62B 1/14* (2013.01); *B62B 5/067* (2013.01); *B62B 1/008* (2013.01); *B62B 2202/42* (2013.01); *B62B 2301/254* (2013.01)

(58) Field of Classification Search
CPC .......... A01K 1/00; A01K 1/0035; A01K 1/02; A01K 1/0245; A01K 1/03; A01K 1/035
USPC .......................................... 119/452, 496, 497
See application file for complete search history.

(56) References Cited

U.S. PATENT DOCUMENTS

| | | | |
|---|---|---|---|
| 4,852,520 A | 8/1989 | Goetz | |
| 5,174,241 A * | 12/1992 | Goguen | A01K 1/0245 |
| | | | 119/496 |
| 5,220,885 A * | 6/1993 | Goetz | A01K 1/0107 |
| | | | 119/165 |
| 5,701,843 A | 12/1997 | Lazides | |
| 6,230,656 B1 | 5/2001 | Walach | |
| 6,953,266 B1 * | 10/2005 | Ver Hage | A01K 1/031 |
| | | | 119/452 |
| 7,036,458 B1 * | 5/2006 | Stornant | A01K 1/011 |
| | | | 119/453 |
| D566,907 S | 4/2008 | Barca | |
| 7,487,744 B1 * | 2/2009 | Goldberg | A01K 1/031 |
| | | | 119/453 |
| 7,594,481 B2 * | 9/2009 | Carter | A01K 1/031 |
| | | | 119/418 |
| 7,882,806 B2 * | 2/2011 | Ver Hage | A01K 1/031 |
| | | | 119/418 |
| 8,522,724 B2 * | 9/2013 | Murrer | A01K 1/033 |
| | | | 119/706 |
| 8,544,417 B2 * | 10/2013 | Sangl | A01K 1/0245 |
| | | | 119/455 |
| 8,584,618 B1 | 11/2013 | Batson et al. | |
| 8,900,101 B2 * | 12/2014 | Stack | A63B 71/022 |
| | | | 119/700 |
| 2010/0192870 A1 | 8/2010 | Wood | |

* cited by examiner

*Primary Examiner* — Richard T Price, Jr.

(57) ABSTRACT

A modular cart assembly includes a first carrier unit that may contain an animal. A pair of wheels is provided. Each of the wheels is rotatably coupled to the first carrier unit. Thus, the first carrier unit may roll along a support surface. A first handle is coupled to the first carrier unit and the first handle may be manipulated. A pair of second carrier units is provided. Each of the second carrier units may contain an animal. Each of the second carriers units is selectively stacked on the first carrier unit. Thus, each of the second carriers units is transportable with the first carrier unit.

16 Claims, 5 Drawing Sheets

MODULAR CART ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to cart devices and more particularly pertains to a new cart device for transporting a plurality of animals.

BRIEF SUMMARY OF THE INVENTION

An embodiment of the disclosure meets the needs presented above by generally comprising a first carrier unit that may contain an animal. A pair of wheels is provided. Each of the wheels is rotatably coupled to the first carrier unit. Thus, the first carrier unit may roll along a support surface. A first handle is coupled to the first carrier unit and the first handle may be manipulated. A pair of second carrier units is provided. Each of the second carrier units may contain an animal. Each of the second carriers units is selectively stacked on the first carrier unit. Thus, each of the second carriers units is transportable with the first carrier unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
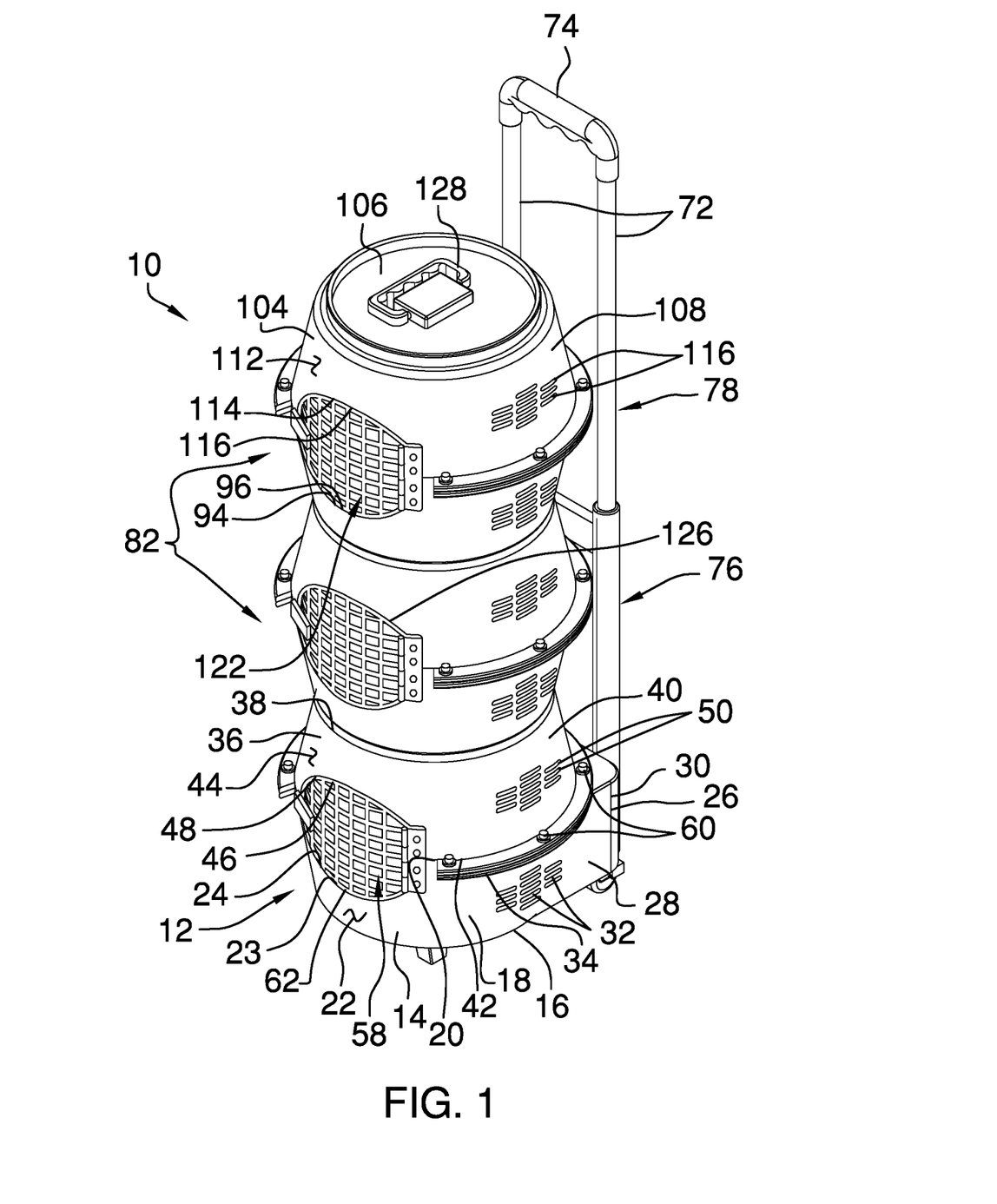
FIG. 1 is a front perspective view of a modular cart assembly according to an embodiment of the disclosure.
Figure 2:
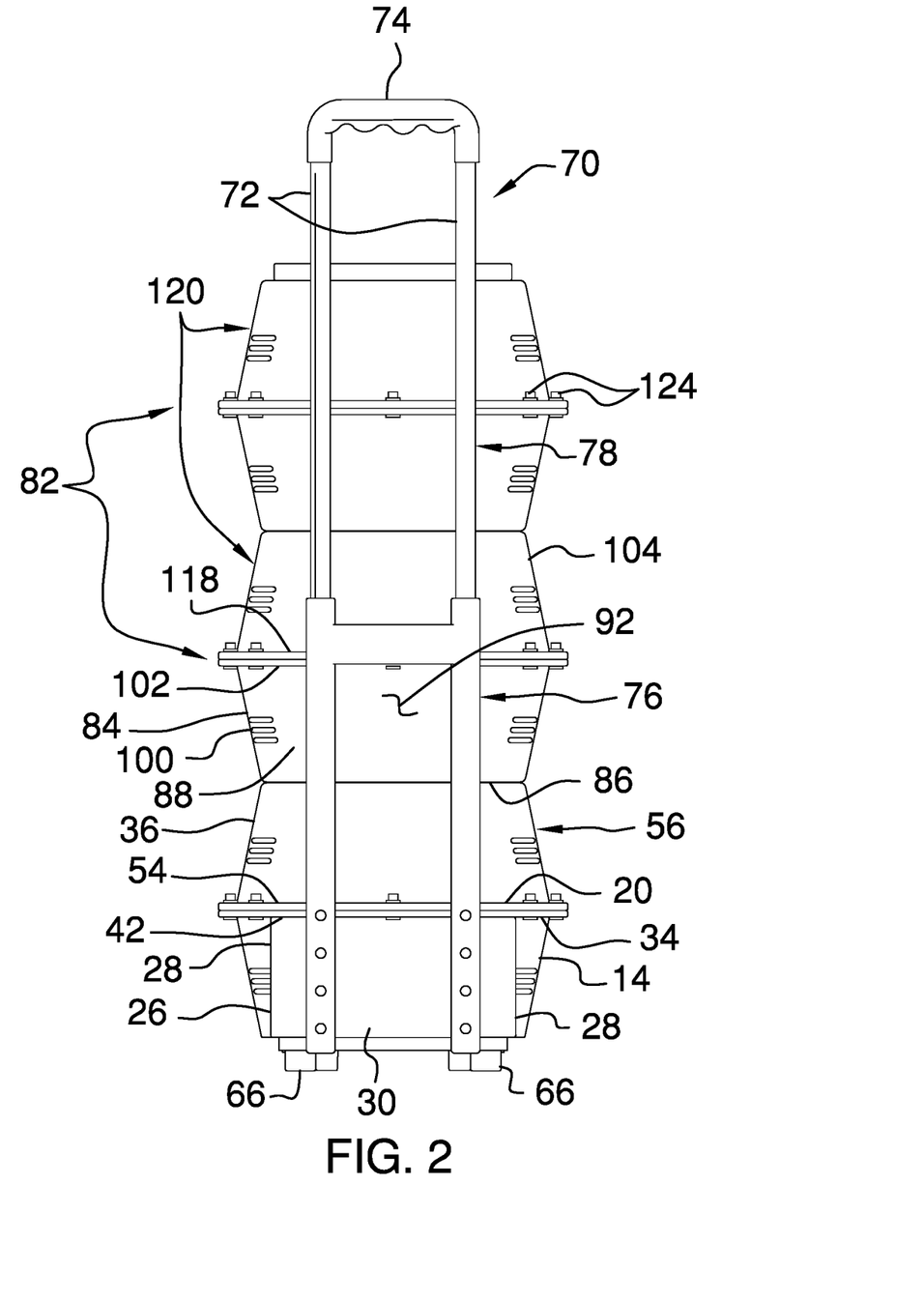
FIG. 2 is a back view of an embodiment of the disclosure.
Figure 3:
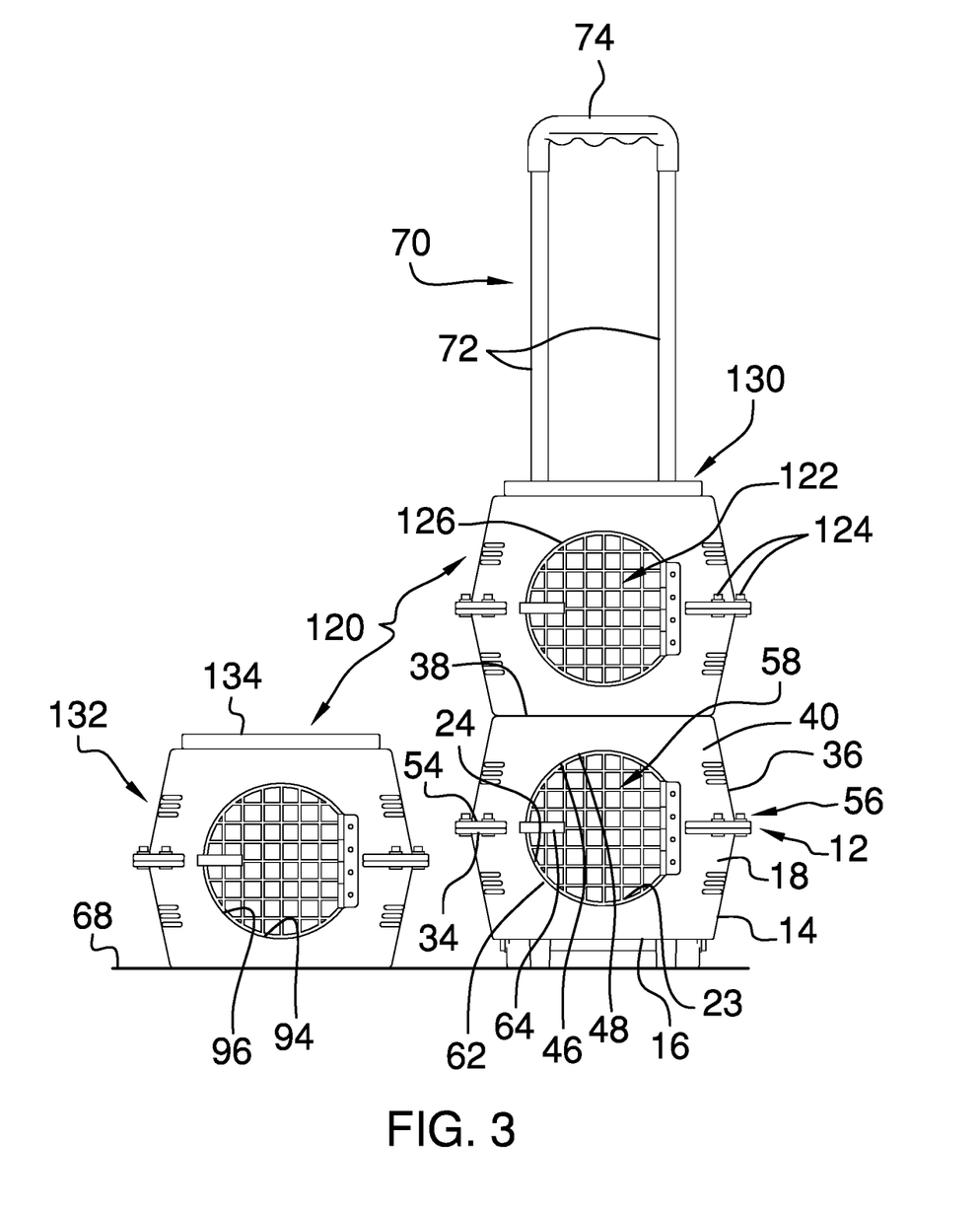
FIG. 3 is a front view of an embodiment of the disclosure.
Figure 4:
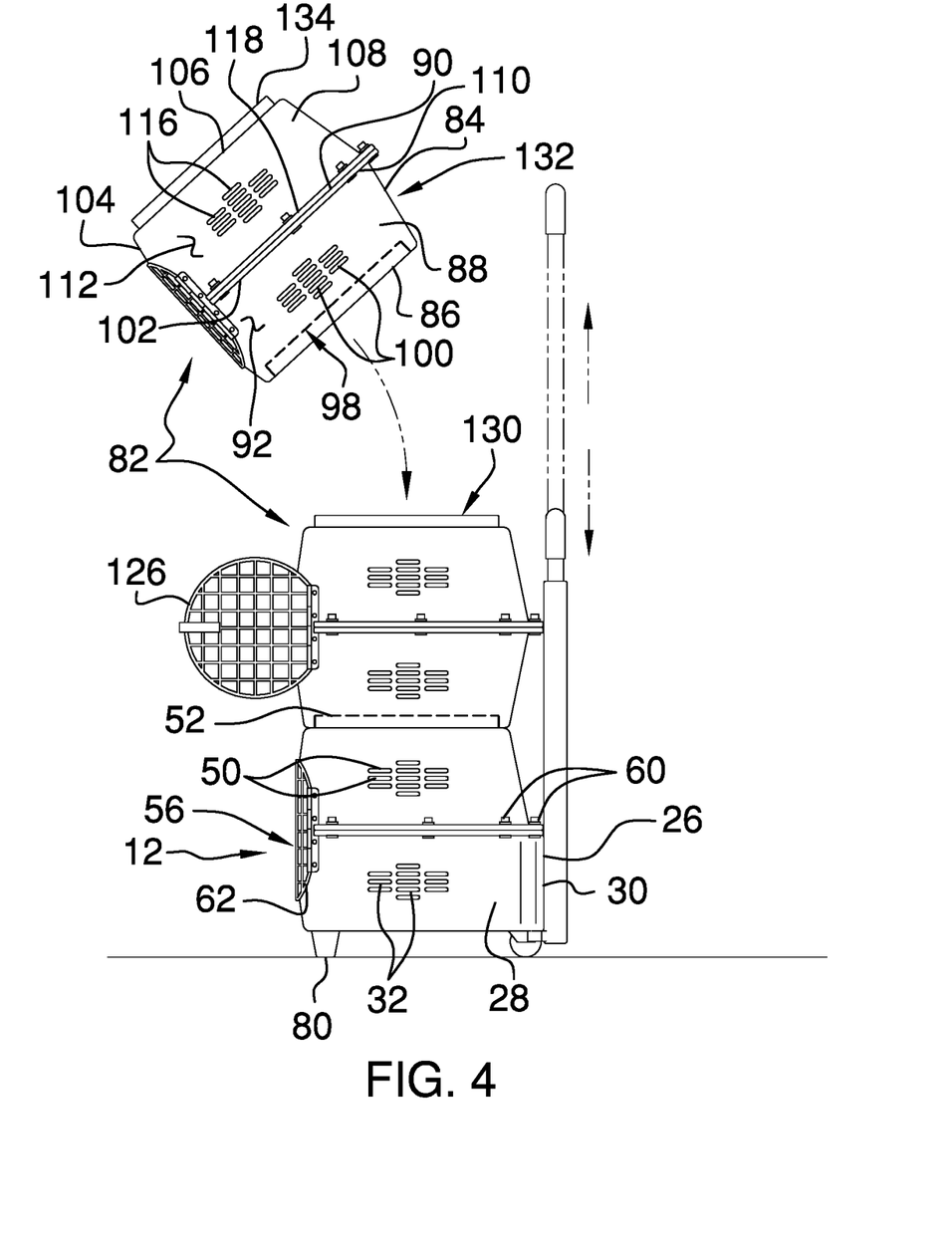
FIG. 4 is a left side view of an embodiment of the disclosure.
Figure 5:
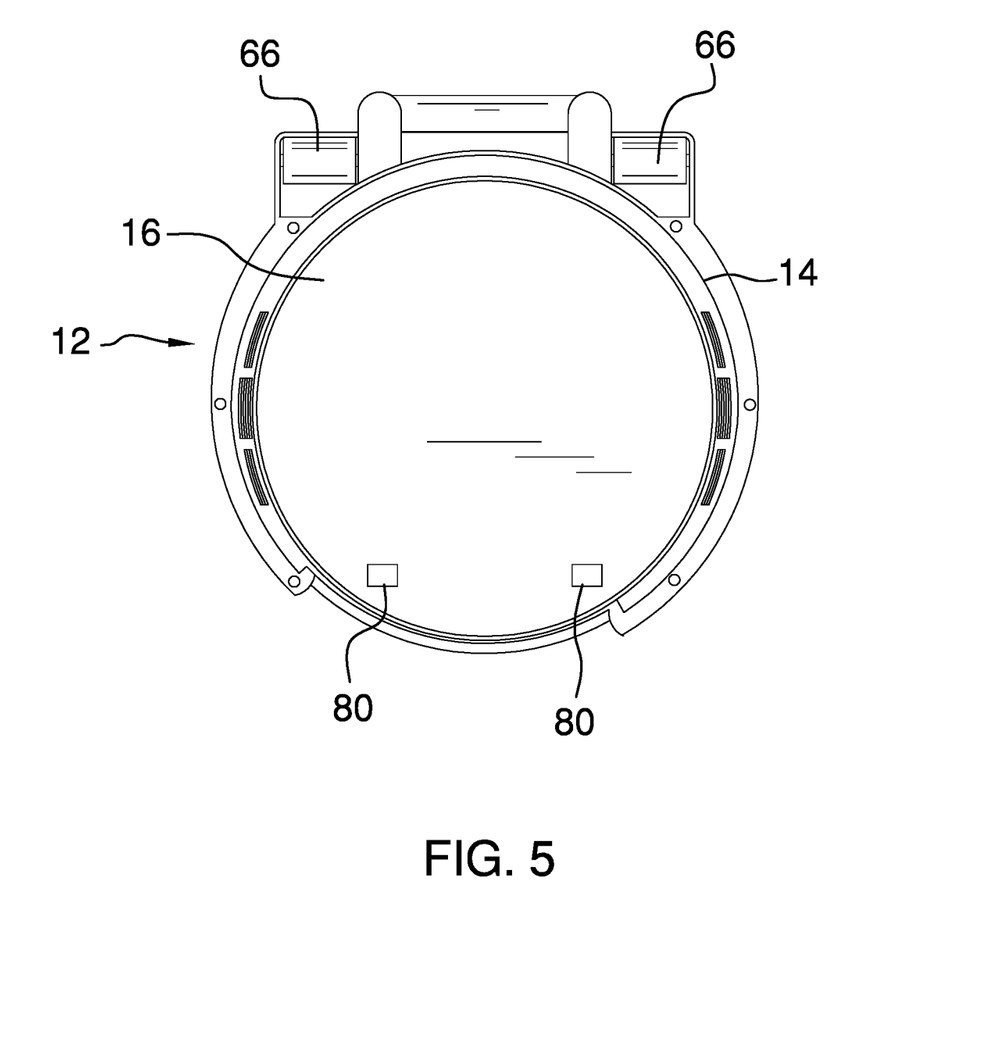
FIG. 5 is a bottom view of an embodiment of the disclosure.

With reference now to the drawings, and in particular to FIGS. 1 through 5 thereof, a new cart device embodying the principles and concepts of an embodiment of the disclosure and generally designated by the reference numeral 10 will be described.

As best illustrated in FIGS. 1 through 5, the modular cart assembly 10 generally comprises a first carrier unit 12. The first carrier unit 12 may contain an animal. The animal may be a cat, a dog or other domesticated animal with a weight ranging between approximately 1.0 kg and 5.5 kg.

The first carrier unit 12 comprises a first bowl 14 has a bottom wall 16 and an outer wall 18 extending upwardly therefrom. The outer wall 18 has a distal edge 20 with respect to the bottom wall 16 and the outer wall 18 has an outer surface 22. The distal edge 20 has a channel 23 extending downwardly toward the bottom wall 16. The channel 23 has a bounding surface 24. The bounding surface 24 is concavely arcuate with respect to the bottom wall 16.

The outer wall 18 has a protrusion 26 extending outwardly therefrom. The protrusion 26 has a pair of lateral sides 28 and a rear side 30 extending between each of the lateral sides 28. The outer wall 18 has a plurality of first slots 32 extending therethrough. Each of the first slots 32 passes air through the outer wall 18.

A first lip 34 is provided. The first lip 34 extends outwardly from the outer surface 22. The first lip 34 extends substantially around the first bowl 14. The first lip 34 is aligned with the distal edge 20 of the outer wall 18.

A second bowl 36 is provided. The second bowl 36 has a top wall 38 and an outside wall 40 extending downwardly therefrom. The outside wall 40 has a distal edge 42 with respect to the top wall 38. The outside wall 40 has an exterior surface 44.

The distal edge 42 of the outside wall 40 has a channel 46 extending toward the top wall 38. The channel 46 of the second bowl 36 has a bounding surface 48. The bounding surface 48 corresponding to the second bowl 36 is concavely arcuate with respect to the top wall 38. The outside wall 40 has a plurality of second slots 50 extending therethrough. Each of the second slots 50 passes air therethrough.

A second lip 52 extends upwardly from the top wall 38. The second lip 52 is continuous such that the second lip 52 forms a closed loop. The second lip 52 is spaced from the outside wall 40. A third lip 54 extends outwardly from the exterior surface 44. The third lip 54 extends substantially around the second bowl 36. The third lip 54 is aligned with the distal edge 20 corresponding to the second bowl 36.

The second bowl 36 is positioned on the first bowl 14 having the third lip 54 abutting the first lip 34 to define a first housing 56. The channel 23 corresponding to the first bowl 14 is aligned with the channel 46 corresponding to the second bowl 36. Thus, a first opening 58 is defined in the first housing 56. The first opening 58 facilitates the animal to be positioned within the first housing 56.

A plurality of first fasteners 60 is provided. Each of the first fasteners 60 extends through the first lip 34 and engages the third lip 54. Thus, the first bowl 14 is coupled to the second bowl 36. Each of the first fasteners 60 may be a bolt or the like.

A first door 62 is provided. The first door 62 is hingedly coupled to the first housing 56. The first door 62 is aligned with the first opening 58 such that the first door 62 selectively closes the first opening 58. Thus, the first door 62 inhibits the animal from escaping the first housing 56. The first door 62 may comprise a grate or the like. A first lock 64 is coupled to the first door 62 and the first lock 64 engages the first housing 56 when the first door 62 is closed. Thus, the first door 62 is selectively retained in a closed position.

A pair of wheels 66 is provided. Each of the wheels 66 is rotatably coupled to the first carrier unit 12. Thus, the first carrier unit 12 may roll along a support surface 68. Each of the wheels 66 is positioned on the bottom wall 16 of the first bowl 14. The support surface 68 may be ground or the like.

A first handle 70 is coupled to the first carrier unit 12 and the first handle 70 may be manipulated. The first handle 70 comprises a pair of uprights 72 and a grip 74 extending between each of the uprights 72. Each of the uprights 72 is coupled to the rear side 30 of the protrusion 26. Each of the uprights 72 comprises a first half 76 that is slidably coupled to a second half 78. Thus, the first handle 70 has a telescopically adjustable height.

A pair of feet 80 is provided. Each of the feet 80 is coupled to the bottom wall 16 of the first bowl 14. Each of the feet 80 abuts the support surface 68 when the first carrier unit 12 is stationary. The feet 80 are spaced from each of the wheels 66.

A pair of second carrier units 82 is provided. Each of the second carrier units 82 may contain an animal. Each of the second carrier units 82 is selectively stacked on the first carrier unit 12. Thus, each of the second carrier units 82 is transportable with the first carrier unit 12.

Each of the second carrier units 82 comprises a third bowl 84. The third bowl 84 has a bottommost wall 86 and an outermost wall 88 extending upwardly therefrom. The outermost wall 88 has a distal edge 90 with respect to the bottommost wall 86. The outermost wall 88 has an outermost surface 92.

The distal edge 90 has a channel 94 extending downwardly toward the bottommost wall 86. The channel 94 has a bounding surface 96. The bounding surface 96 corresponding to the third bowl 84 is concavely arcuate with respect to the bottommost wall 86. The bottommost wall 86 has a groove 98 extending upwardly therein. The groove 98 is continuous such that the groove 98 forms a closed loop and the groove 98 is spaced from the outermost wall 88.

The outermost wall 88 has a plurality of third slots 100 extending therethrough. Thus, each of the third slots 100 passes air through the outermost wall 88. A fourth lip 102 extends outwardly from the outermost surface 92. The fourth lip 102 extends substantially around the third bowl 84. The fourth lip 102 is aligned with the distal edge 90 of the outermost wall 88.

A fourth bowl 104 is provided. The fourth bowl 104 has a topmost wall 106 and an exterior wall 108 extending downwardly therefrom. The exterior wall 108 has a distal edge 110 with respect to the topmost wall 106. The exterior wall 108 has an outwardly facing surface 112. The distal edge 110 of the exterior wall 108 has a channel 114 extending toward the topmost wall 106. The channel 114 of the fourth bowl 104 has a bounding surface 116. The bounding surface 116 corresponding to the fourth bowl 104 is concavely arcuate with respect to the topmost wall 106.

A fifth lip 134 extends upwardly from the topmost wall 106. The fifth lip 134 is continuous such that the fifth lip 134 forms a closed loop. The fifth lip 134 is spaced from the exterior wall 108. The exterior wall 108 has a plurality of fourth slots 116 extending therethrough wherein each of the fourth slots 116 is configured to pass air therethrough.

A sixth lip 118 extends outwardly from the outwardly facing surface 112. The sixth lip 118 extends substantially around the fourth bowl 104. The sixth lip 118 is aligned with the distal edge 20 corresponding to the fourth bowl 104. The third bowl 84 is positioned on the fourth bowl 104 having the fourth lip 102 abutting the sixth lip 118 to define a second housing 120. The channel 94 corresponding to the third bowl 84 is aligned with the channel 114 corresponding to the fourth bowl 104. Thus, a second opening 122 is defined in the second housing 120. The second opening 122 facilitates the animal to be positioned within the second housing 120.

A plurality of second fasteners 124 is provided. Each of the second fasteners 124 extends through the fourth lip 102 and engages the sixth lip 118. Thus, the third bowl 84 is coupled to the fourth bowl 104. Each of the second fasteners 124 may comprise a bolt or the like.

A second door 126 is hingedly coupled to the second housing 120. The second door 126 is aligned with the second opening 122. Thus, the second door 126 selectively closes the second opening 122. The second door 126 inhibits the animal from escaping the second housing 120. The second door 126 may comprise a grate or the like.

A second handle 128 is provided. The second handle 128 is movably coupled to the topmost wall 106 of the fourth bowl 104. The second handle 128 may be gripped thereby facilitating the second housing 120 to be selectively transported. The second handle 128 may have a plurality of finger slots thereby enhancing gripping the second handle 128.

The pair of second carrier units 82 includes a middle carrier unit 130 and a top carrier unit 132. The middle carrier unit 130 is selectively positioned on top of the first carrier unit 12. The groove 98 in the middle carrier unit 130 engages the second lip 52. Thus, the middle carrier unit 130 is inhibited from sliding off of the first carrier unit 12. The top carrier unit 132 is selectively placed on top of the middle carrier unit 130. The groove 98 in the top carrier unit 132 engages the fifth lip 134 on the middle carrier unit 130. Thus, the top carrier unit 132 is inhibited from sliding off of the middle carrier unit 130.

In use, a selected animal is positioned in the first carrier unit 12. The first door 62 is closed. The first handle 70 is gripped and the first carrier unit 12 is transported. The selected animal is safely transported to a veterinarian or the like.

The pair of second carrier units 82 facilitates two or more animals to be simultaneously transported. The middle carrier unit 130 is selectively positioned on top of the first carrier unit 12. A selected animal is positioned in the middle carrier unit 130 and the second door 126 corresponding to the middle carrier unit 130 is closed. The first handle 70 is gripped and each of the first carrier unit 12 and the middle carrier unit 130 is transported.

The top carrier unit 132 is selectively positioned on top of the middle carrier unit 130. A selected animal is positioned in the top carrier unit 132 and the second door 126 corresponding to the top carrier unit 132 is closed. The first handle 70 is gripped and each of the first carrier unit 12, the middle carrier unit 130 and the top carrier unit 132 are transported.

Each of the middle 130 and top 132 carrier units are independently transportable with respect to the first carrier unit 12. The second handle 128 on the middle carrier unit 130 is gripped to independently transport the middle carrier unit 130. The second handle 128 on the top carrier unit 132 is gripped to independently transport the top carrier unit 132.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A modular cart assembly being configured to transport a plurality of animals, said assembly comprising:
   a first carrier unit being configured to contain an animal;
   a pair of wheels, each of said wheels being rotatably coupled to said first carrier unit wherein said first carrier unit is configured to roll along a support surface, said pair of wheels having concentrically aligned respective centers;
   a first handle being coupled to said first carrier unit wherein said first handle is configured to be manipulated, said first handle having a lower end coupled to said first carrier adjacent to each of said wheels of said pair of wheels wherein said first handle is configured to facilitate movement of said first carrier unit by pivoting said first carrier unit away from a ground surface and onto said pair of wheels; and
   a pair of second carrier units, each of said second carrier units being configured to contain an animal, each of said second carriers units being selectively stacked on said first carrier unit such that each of said second carriers units is transportable with said first carrier unit.

2. The assembly according to claim 1, wherein said first carrier unit comprises a first bowl having a bottom wall and an outer wall extending upwardly therefrom, said outer wall having a distal edge with respect to said bottom wall, said outer wall having an outer surface, said distal edge having a channel extending downwardly toward said bottom wall, said channel having a bounding surface, said bounding surface being concavely arcuate with respect to said bottom wall.

3. The assembly according to claim 2, wherein:
   said outer wall has a protrusion extending outwardly therefrom, said protrusion having a pair of lateral sides and a rear side extending between each of said lateral sides; and
   said outer wall has a plurality of first slots extending therethrough wherein each of said first slots is configured to pass air through said outer wall.

4. The assembly according to claim 2, further comprising a first lip extending outwardly from said outer surface, said first lip extending substantially around said first bowl, said first lip being aligned with said distal edge of said outer wall.

5. The assembly according to claim 1, wherein said first carrier unit comprises a second bowl having a top wall and an outside wall extending downwardly therefrom, said outside wall having a distal edge with respect to said top wall, said outside wall having an exterior surface, said distal edge of said outside wall having a channel extending toward said top wall, said channel of said second bowl having an bounding surface, said bounding surface corresponding to said second bowl being concavely arcuate with respect to said top wall, said outside wall having a plurality of second slots extending therethrough wherein each of said second slots is configured to pass air therethrough.

6. The assembly according to claim 5, further comprising a second lip extending upwardly from said top wall, said second lip being continuous such that said second lip forms a closed loop, said second lip being spaced from said outside wall.

7. The assembly according to claim 6, further comprising:
   a third lip extending outwardly from said exterior surface, said third lip extending substantially around said second bowl, said third lip being aligned with said distal edge corresponding to said second bowl;
   said second bowl being positioned on said first bowl having said third lip abutting said first lip to define a first housing, said channel corresponding to said first bowl being aligned with said channel corresponding to said second bowl to define a first opening into said first housing wherein said first opening is configured to facilitate the animal to be positioned within said first housing; and
   a plurality of first fasteners, each of said first fasteners extending through said first lip and engaging said third lip such that said first bowl is coupled to said second bowl.

8. The assembly according to claim 7, further comprising a first door being hingedly coupled to said first housing, said first door being aligned with said first opening such that said first door selectively closes said first opening wherein said first door is configured to inhibit the animal from escaping said first housing.

9. The assembly according to claim 1, wherein each of said second carrier units comprises:
   a third bowl having a bottommost wall and an outermost wall extending upwardly therefrom, said outermost wall having a distal edge with respect to said bottommost wall, said outermost wall having an outermost surface;
   said distal edge having a channel extending downwardly toward said bottommost wall, said channel having a bounding surface, said bounding surface corresponding to said third bowl being concavely arcuate with respect to said bottommost wall; and
   said bottommost wall having a groove extending upwardly therein, said groove being continuous such that said groove forms a closed loop, said groove being spaced from said outermost wall.

10. The assembly according to claim 9, wherein:
said outermost wall having a plurality of third slots extending therethrough wherein each of said third slots is configured to pass air through said outermost wall; and
a fourth lip extending outwardly from said outermost surface, said fourth lip extending substantially around said third bowl, said fourth lip being aligned with said distal edge of said outermost wall.

11. The assembly according to claim 1, wherein:
said second carrier unit comprises a fourth bowl having a topmost wall and an exterior wall extending downwardly therefrom, said exterior wall having a distal edge with respect to said topmost wall, said exterior wall having an outwardly facing surface;
said distal edge of said exterior wall having a channel extending toward said topmost wall, said channel of said fourth bowl having an bounding surface, said bounding surface corresponding to said fourth bowl being concavely arcuate with respect to said topmost wall; and
said exterior wall having a plurality of fourth slots extending therethrough wherein each of said fourth slots is configured to pass air therethrough.

12. The assembly according to claim 11, further comprising a fifth lip extending upwardly from said topmost wall, said fifth lip being continuous such that said fifth lip forms a closed loop, said fifth lip being spaced from said exterior wall.

13. The assembly according to claim 12, further comprising:
a sixth lip extending outwardly from said outwardly facing surface, said sixth lip extending substantially around said fourth bowl, said sixth lip being aligned with said distal edge corresponding to said fourth bowl;
said third bowl being positioned on said fourth bowl having said fourth lip abutting said sixth lip to define a second housing, said channel corresponding to said third bowl being aligned with said channel corresponding to said fourth bowl to define a second opening into said second housing wherein said second opening is configured to facilitate the animal to be positioned within said second housing; and
a plurality of second fasteners, each of said second fasteners extending through said fourth lip and engaging said sixth lip such that said third bowl is coupled to said fourth bowl.

14. The assembly according to claim 13, further comprising a second door being hingedly coupled to said second housing, said second door being aligned with said second opening such that said second door selectively closes said second opening wherein said second door is configured to inhibit the animal from escaping said second housing.

15. The assembly according to claim 11, further comprising a second handle being movably coupled to said topmost wall of said fourth bowl wherein said second handle is configured to be gripped thereby facilitating said second housing to be selectively transported.

16. A modular cart assembly being configured to transport a plurality of animals, said assembly comprising:
a first carrier unit being configured to contain an animal, said first carrier unit comprising:
a first bowl having a bottom wall and an outer wall extending upwardly therefrom, said outer wall having a distal edge with respect to said bottom wall, said outer wall having an outer surface, said distal edge having a channel extending downwardly toward said bottom wall, said channel having a bounding surface, said bounding surface being concavely arcuate with respect to said bottom wall, said outer wall having a protrusion extending outwardly therefrom, said protrusion having a pair of lateral sides and a rear side extending between each of said lateral sides, said outer wall having a plurality of first slots extending therethrough wherein each of said first slots is configured to pass air through said outer wall,
a first lip extending outwardly from said outer surface, said first lip extending substantially around said first bowl, said first lip being aligned with said distal edge of said outer wall,
a second bowl having a top wall and an outside wall extending downwardly therefrom, said outside wall having a distal edge with respect to said top wall, said outside wall having an exterior surface, said distal edge of said outside wall having a channel extending toward said top wall, said channel of said second bowl having an bounding surface, said bounding surface corresponding to said second bowl being concavely arcuate with respect to said top wall, said outside wall having a plurality of second slots extending therethrough wherein each of said second slots is configured to pass air therethrough,
a second lip extending upwardly from said top wall, said second lip being continuous such that said second lip forms a closed loop, said second lip being spaced from said outside wall,
a third lip extending outwardly from said exterior surface, said third lip extending substantially around said second bowl, said third lip being aligned with said distal edge corresponding to said second bowl, said second bowl being positioned on said first bowl having said third lip abutting said first lip to define a first housing, said channel corresponding to said first bowl being aligned with said channel corresponding to said second bowl to define a first opening into said first housing wherein said first opening is configured to facilitate the animal to be positioned within said first housing,
a plurality of first fasteners, each of said first fasteners extending through said first lip and engaging said third lip such that said first bowl is coupled to said second bowl, and
a first door being hingedly coupled to said first housing, said first door being aligned with said first opening such that said first door selectively closes said first opening wherein said first door is configured to inhibit the animal from escaping said first housing;
a pair of wheels, each of said wheels being rotatably coupled to said first carrier unit wherein said first carrier unit is configured to roll along a support surface, each of said wheels being positioned on said bottom wall of said first bowl;
a first handle being coupled to said first carrier unit wherein said first handle is configured to be manipulated, said first handle comprising a pair of uprights and a grip extending between each of said uprights, each of said uprights being coupled to said rear side of said protrusion, each of said uprights comprising a first half being slidably coupled to a second half such that said first handle has a telescopically adjustable height;

a pair of feet, each of said feet being coupled to said bottom wall of said first bowl, each of said feet being configured to abut the support surface when said first carrier unit is stationary; and a pair of second carrier units, each of said second carrier units being configured to contain an animal, each of said second carriers units being selectively stacked on said first carrier unit such that each of said second carriers units is transportable with said first carrier unit, each of said second carrier units comprising:

a third bowl having a bottommost wall and an outermost wall extending upwardly therefrom, said outermost wall having a distal edge with respect to said bottommost wall, said outermost wall having an outermost surface, said distal edge having a channel extending downwardly toward said bottommost wall, said channel having a bounding surface, said bounding surface corresponding to said third bowl being concavely arcuate with respect to said bottommost wall, said bottommost wall having a groove extending upwardly therein, said groove being continuous such that said groove forms a closed loop, said groove being spaced from said outermost wall, said outermost wall having a plurality of third slots extending therethrough wherein each of said third slots is configured to pass air through said outermost wall, a fourth lip extending outwardly from said outermost surface, said fourth lip extending substantially around said third bowl, said fourth lip being aligned with said distal edge of said outermost wall, a fourth bowl having a topmost wall and an exterior wall extending downwardly therefrom, said exterior wall having a distal edge with respect to said topmost wall, said exterior wall having an outwardly facing surface, said distal edge of said exterior wall having a channel extending toward said topmost wall, said channel of said fourth bowl having an bounding surface, said bounding surface corresponding to said fourth bowl being concavely arcuate with respect to said topmost wall, a fifth lip extending upwardly from said topmost wall, said fifth lip being continuous such that said fifth lip forms a closed loop, said fifth lip being spaced from said exterior wall, said exterior wall having a plurality of fourth slots extending therethrough wherein each of said fourth slots is configured to pass air therethrough, a sixth lip extending outwardly from said outwardly facing surface, said sixth lip extending substantially around said fourth bowl, said sixth lip being aligned with said distal edge corresponding to said fourth bowl, said third bowl being positioned on said fourth bowl having said fourth lip abutting said sixth lip to define a second housing, said channel corresponding to said third bowl being aligned with said channel corresponding to said fourth bowl to define a second opening into said second housing wherein said second opening is configured to facilitate the animal to be positioned within said second housing, a plurality of second fasteners, each of said second fasteners extending through said fourth lip and engaging said sixth lip such that said third bowl is coupled to said fourth bowl, a second door being hingedly coupled to said second housing, said second door being aligned with said second opening such that said second door selectively closes said second opening wherein said second door is configured to inhibit the animal from escaping said second housing, and a second handle being movably coupled to said topmost wall of said fourth bowl wherein said second handle is configured to be gripped thereby facilitating said second housing to be selectively transported.

* * * * *